(12) United States Patent
Cipriani et al.

(10) Patent No.: US 11,953,105 B2
(45) Date of Patent: Apr. 9, 2024

(54) VALVE CARTRIDGE ASSEMBLY

(71) Applicant: Delta Faucet Company, Indianapolis, IN (US)

(72) Inventors: Mark Cipriani, Carmel, IN (US); DeWayne Davis, Lebanon, IN (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

(21) Appl. No.: 17/900,331

(22) Filed: Aug. 31, 2022

(65) Prior Publication Data

US 2024/0068579 A1    Feb. 29, 2024

(51) Int. Cl.
| | |
|---|---|
| *F16K 11/074* | (2006.01) |
| *F16K 3/06* | (2006.01) |
| *F16K 11/00* | (2006.01) |
| *F16K 31/60* | (2006.01) |

(52) U.S. Cl.
CPC .............. *F16K 11/074* (2013.01); *F16K 3/06* (2013.01); *F16K 19/006* (2013.01); *F16K 31/60* (2013.01); *Y10T 137/7613* (2015.04); *Y10T 137/9464* (2015.04)

(58) Field of Classification Search
CPC ... F16K 3/06; F16K 3/08; F16K 3/085; F16K 19/006; F16K 11/072; F16K 11/074; F16K 11/076; F16K 11/085; F16K 31/60; E03C 1/02; E03C 1/04; E03C 1/0403; E03C 2001/026; E03C 2201/00; E03C 2201/30; E03C 2201/80; Y10T 137/6017; Y10T 137/7504; Y10T 137/7613; Y10T 137/9464
USPC ...................... 137/315.13, 454.2, 454.6, 801
See application file for complete search history.

(56) References Cited

U.S. PATENT DOCUMENTS

| | | | |
|---|---|---|---|
| 4,700,928 A | 10/1987 | Marty | |
| 4,793,375 A | 12/1988 | Marty | |
| 5,996,614 A * | 12/1999 | Ashton | F16K 3/08 |
| | | | 137/454.6 |
| 7,353,838 B2 * | 4/2008 | Schmitt | E03C 1/102 |
| | | | 137/216 |
| 8,689,818 B2 | 4/2014 | Marty | |
| 8,881,755 B2 | 11/2014 | Thomas | |
| 8,899,259 B2 | 12/2014 | Jonte | |
| 9,151,397 B2 | 10/2015 | Pinette | |
| 9,403,304 B2 | 8/2016 | Thomas | |
| 9,476,187 B2 * | 10/2016 | Liang | F16K 27/02 |
| 9,939,083 B2 | 4/2018 | Kemp | |
| 9,951,880 B2 | 4/2018 | Thomas | |
| 2007/0044852 A1 * | 3/2007 | Pinette | E03C 1/0403 |
| | | | 137/606 |
| 2011/0073205 A1 * | 3/2011 | Marty | E03C 1/0403 |
| | | | 137/801 |

(Continued)

OTHER PUBLICATIONS

Technical drawing of Existing Valve Body Assy, 1 pg., at least as early as Nov. 2021.

*Primary Examiner* — Kenneth Rinehart
*Assistant Examiner* — Jonathan J Waddy
(74) *Attorney, Agent, or Firm* — Bose McKinney & Evans LLP (57) ABSTRACT

A valve cartridge assembly supported by a receiver and fluidly coupled to a waterway assembly. The waterway assembly includes a base and a plurality of flexible tubular members. A gasket is received intermediate the receiver and the waterway assembly.

20 Claims, 11 Drawing Sheets

(56) References Cited

U.S. PATENT DOCUMENTS

2012/0018020 A1* 1/2012 Moore ................ E03C 1/0403
137/801
2021/0254316 A1   8/2021 Rosko
2021/0356048 A1  11/2021 Allen

* cited by examiner

VALVE CARTRIDGE ASSEMBLY

BACKGROUND AND SUMMARY OF THE DISCLOSURE

The present invention relates generally to a valve cartridge assembly and, more particularly, to a valve cartridge assembly including an outer housing supported by a polymeric receiver.

More particularly, the present disclosure relates to a valve cartridge assembly including an outer housing and operably coupled to a polymeric receiver and a waterway assembly. A gasket provides a seal between the receiver and the waterway assembly. More particularly, the valve cartridge is at least partially received within the polymeric receiver. This configuration eliminates the need for a brass housing and brazed supply lines, which are often used in existing faucets. This illustrative valve cartridge assembly is configured to decrease cost and improve reliability.

According to an illustrative embodiment of the present disclosure, a valve cartridge assembly includes a valve cartridge having a valve body with a cylindrical sidewall extending along a longitudinal axis, a valve stem extending along the longitudinal axis of the valve body, the valve stem including an upper portion and a lower portion, a flow plate coupled to the lower portion of the valve stem for rotation therewith and having an inlet port, and an outlet port formed in the lower portion of the valve stem and in fluid communication with the inlet port. A receiver is formed of a polymer and includes a body having a cylindrical sidewall, the receiver supporting the valve cartridge. A waterway assembly is formed of a polymer and is fluidly coupled to the valve cartridge. The waterway assembly includes a base and a plurality of flexible tubular members supported by the base. A gasket is received intermediate the receiver and the base of the waterway assembly.

According to another illustrative embodiment of the present disclosure, a valve cartridge assembly includes a valve cartridge having a valve body with a cylindrical sidewall extending along a longitudinal axis, a valve stem extending along the longitudinal axis of the valve body, the valve stem including an upper portion and a lower portion, and a flow plate coupled to the lower portion of the valve stem, the flow plate including an inlet port supported for rotation with the valve stem. A receiver is formed of a polymer and includes a body having a cylindrical sidewall, the receiver supporting the valve cartridge. A waterway assembly is formed of a polymer and is fluidly coupled to the valve cartridge. The waterway assembly includes a base and a plurality of flexible tubular members supported by the base. A gasket is received intermediate the receiver and the base of the waterway assembly. A mounting shank includes a lower shaft having external threads. The receiver, the base of the waterway assembly, and the gasket are received within the lower shaft of the mounting shank.

According to a further illustrative embodiment of the present disclosure, a valve cartridge assembly includes a valve cartridge having a valve body with a cylindrical sidewall extending along the longitudinal axis, and an arcuate extension defining a slot, a valve stem extending along the longitudinal axis of the valve body, the valve stem including an upper portion and a lower portion, and a flow plate supported for rotation with the valve stem and having an inlet port. A receiver is formed of a polymer and includes a body having a cylindrical sidewall, the receiver supporting the valve cartridge. A waterway assembly is formed of a polymer and is fluidly coupled to the valve cartridge. The waterway assembly includes a base and a plurality of flexible tubular members supported by the base. A gasket is received intermediate the receiver and the base of the waterway assembly. A faucet handle includes a protrusion, wherein the protrusion cooperates with the slot of the valve cartridge to act as a limit stop.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

For the purposes of promoting and understanding the principles of the present disclosure, reference will now be made to the embodiments illustrated in the drawings, which are described herein. The embodiments disclosed herein are not intended to be exhaustive or to limit the invention to the precise form disclosed. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of principles in the invention which would normally occur to one skilled in the art to which the invention relates.

Figure 1:
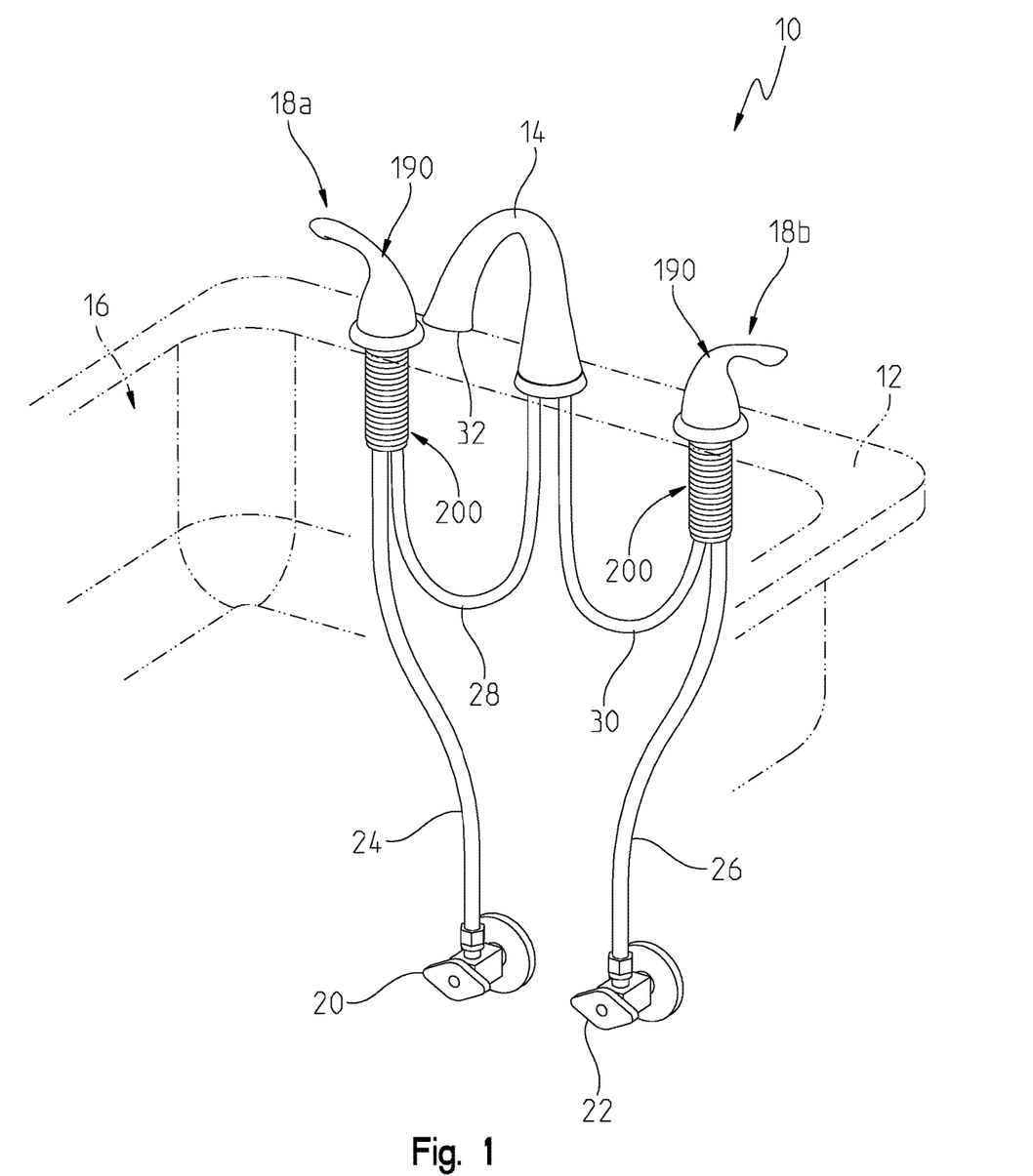
FIG. 1 is a perspective view of a faucet including an illustrative valve cartridge assembly of the present disclosure.
Figure 2:
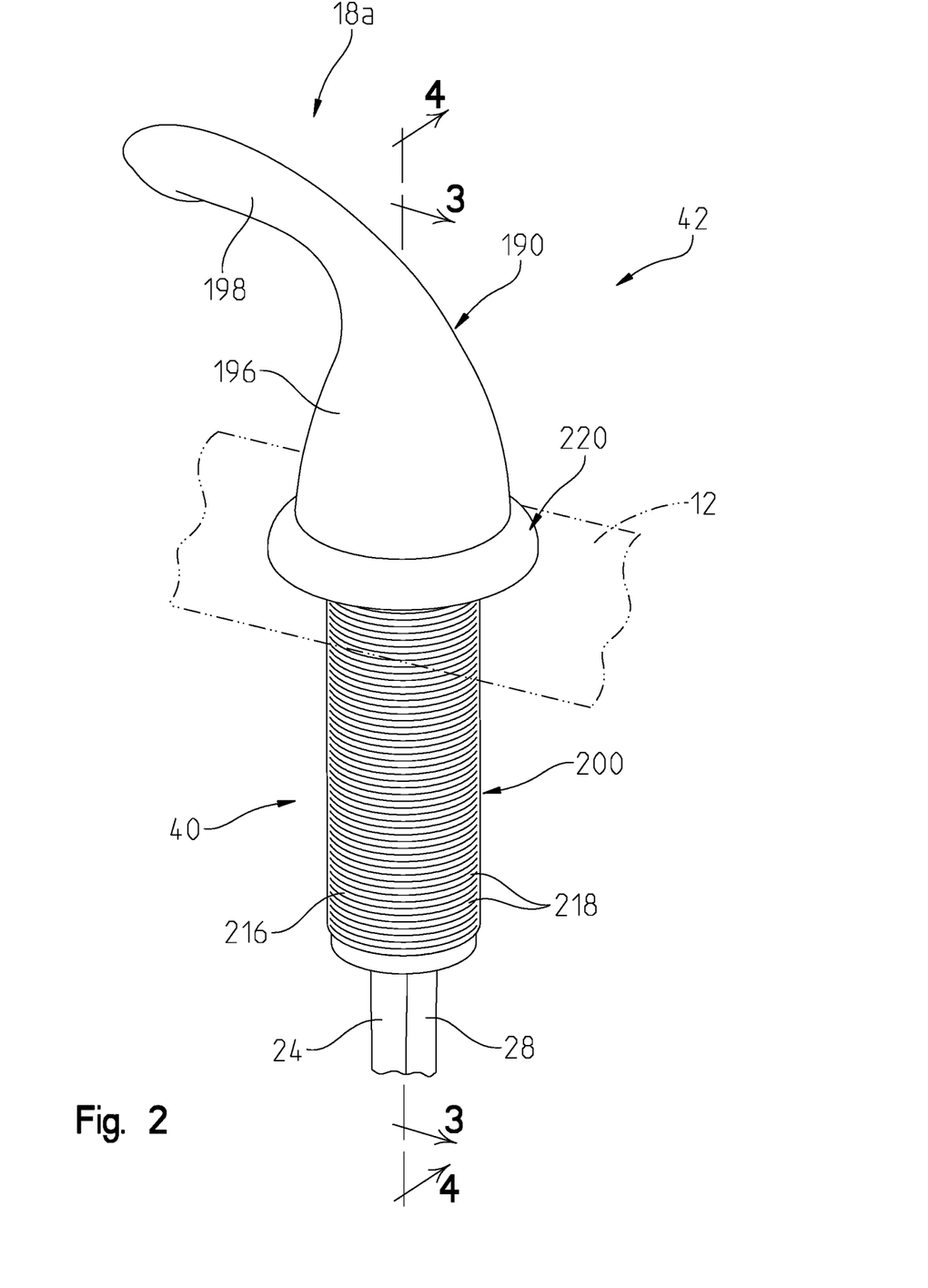
FIG. 2 is a perspective view of a hot water valve assembly including the illustrative valve cartridge assembly of the present disclosure.

Referring initially to FIG. 1, an illustrative faucet 10 is shown coupled to a mounting deck, such as a sink deck 12. The faucet 10 illustratively includes a delivery spout 14 for discharging water into a sink basin 16 surrounded by the sink deck 12. Illustratively, a hot water valve assembly 18*a* and a cold water valve assembly 18*b* are illustratively mounted on the sink deck 12 in spaced relation to, and on opposite sides of, the delivery spout 14. Hot water is supplied from a hot water source 20 (illustratively, a conventional hot water stop) to the hot water valve assembly 18*a*. Similarly, cold water is supplied from a cold water source 22 (illustratively, a conventional cold water stop) to the cold water valve assembly 18*b*.

Illustratively, hot water and cold water inlet conduits 24 and 26 fluidly couple the hot water and cold water sources 20 and 22 to the hot water and cold water valve assemblies 18*a* and 18*b*, respectively. As is known, the valve assemblies 18*a* and 18*b* control water flow from the hot water and cold water inlet conduits 24 and 26 to hot water and cold water outlet conduits 28 and 30, respectively, and subsequently to a water outlet 32 of the delivery spout 14. The hot water and cold water inlet conduits 24 and 26, and the hot water and cold water outlet conduits 28 and 30 are illustratively formed of a flexible tubular material, such as a polymer (e.g., a cross-linked polyethylene (PEX)).

In the following detailed description and accompanying drawings, the hot water valve assembly 18*a* is illustrated and described in further detail. However, the hot water and the cold water valve assemblies 18*a* and 18*b* are substantially identical except for their relative rotation during operation (e.g., counter-clockwise by approximately 90 degrees from an off position to a full water flow position for the hot water valve assembly 18*a*, and clockwise by approximately 90 degrees from an off position to a full water flow position for the cold water valve assembly 18*b*).

With reference to FIGS. 1-4, the hot water valve assembly 18*a* illustratively includes a lower portion 40 extending below the sink deck 12, and an upper portion 42 extending above the sink deck 12. The lower portion 40 illustratively includes a flow control valve cartridge assembly 44 fluidly coupled intermediate the water inlet conduit 24 and the water outlet conduit 28.

With reference to FIGS. 2-6, the illustrative valve assembly 44 includes a valve housing or body 46 supporting a rotatable valve stem 48. The valve stem 48 illustratively includes an upper portion 52 and an enlarged lower portion 54. The valve stem 48 is illustratively formed of a single piece, such as a molded polymer, for example a thermoplastic (e.g., nylon). The valve stem 48 is rotatable relative to the valve body 46 in a first direction (e.g., counter-clockwise) and an opposite second direction (e.g., clockwise) to control (e.g., permit and inhibit, respectively) water flow through the valve assembly 44.

Figure 6:
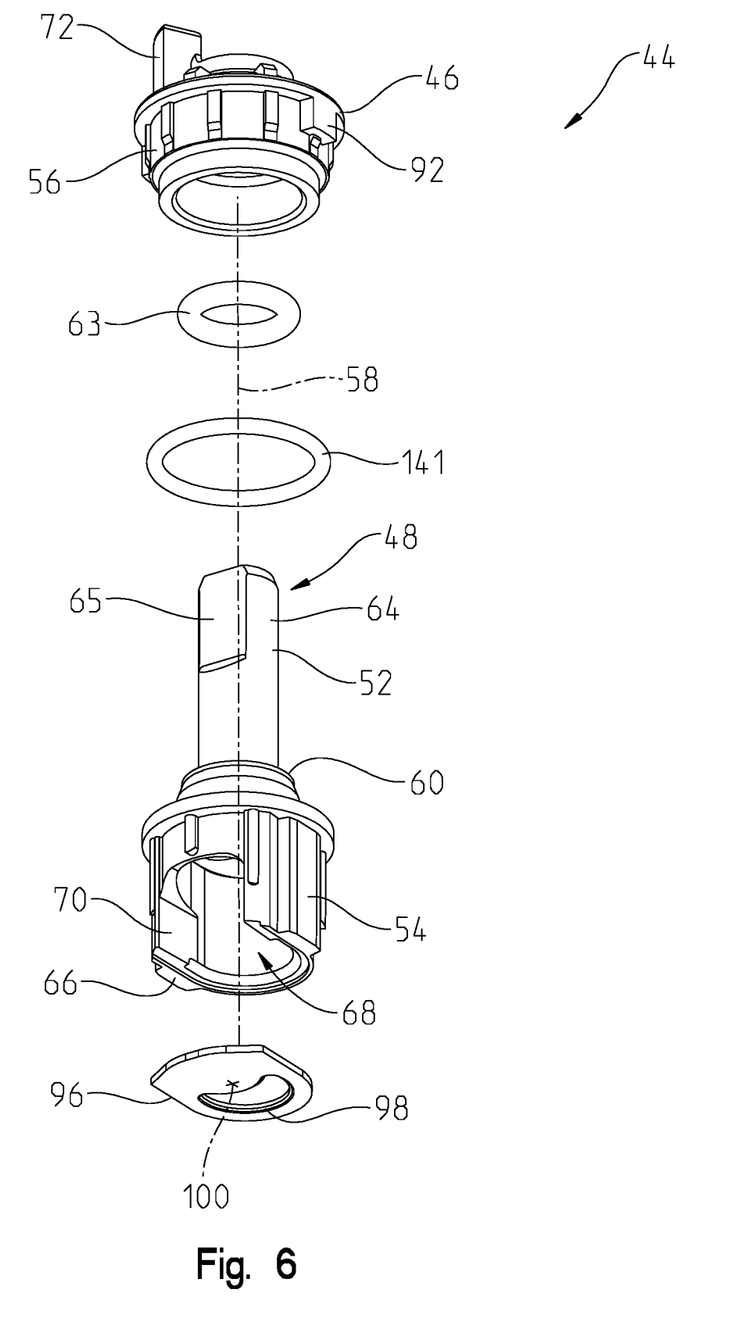
FIG. 6 is a lower exploded perspective view of the illustrative valve cartridge of the present disclosure.
Figure 7:
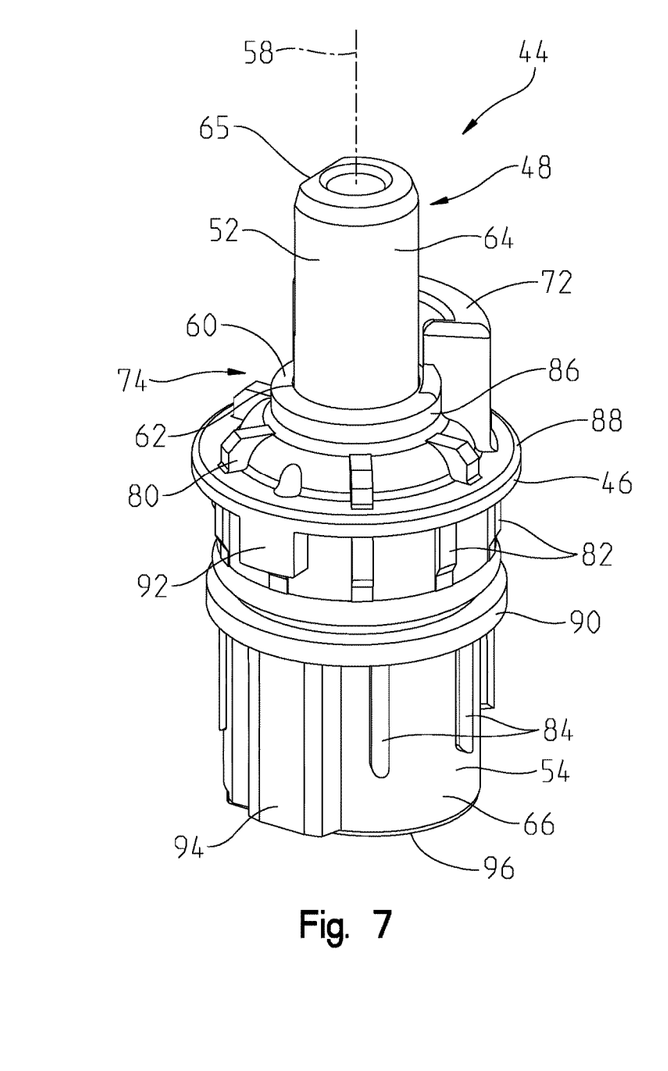
FIG. 7 is a first perspective view of the illustrative valve cartridge of FIG. 6.
Figure 8:
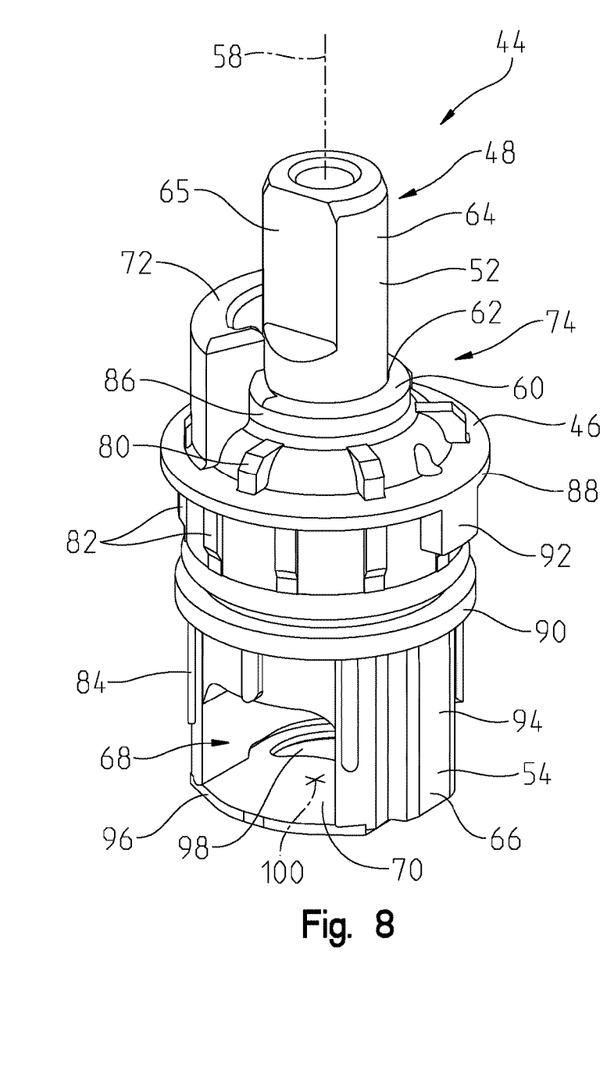
FIG. 8 is a second perspective view of the illustrative valve cartridge of FIG. 6.
Figure 9:
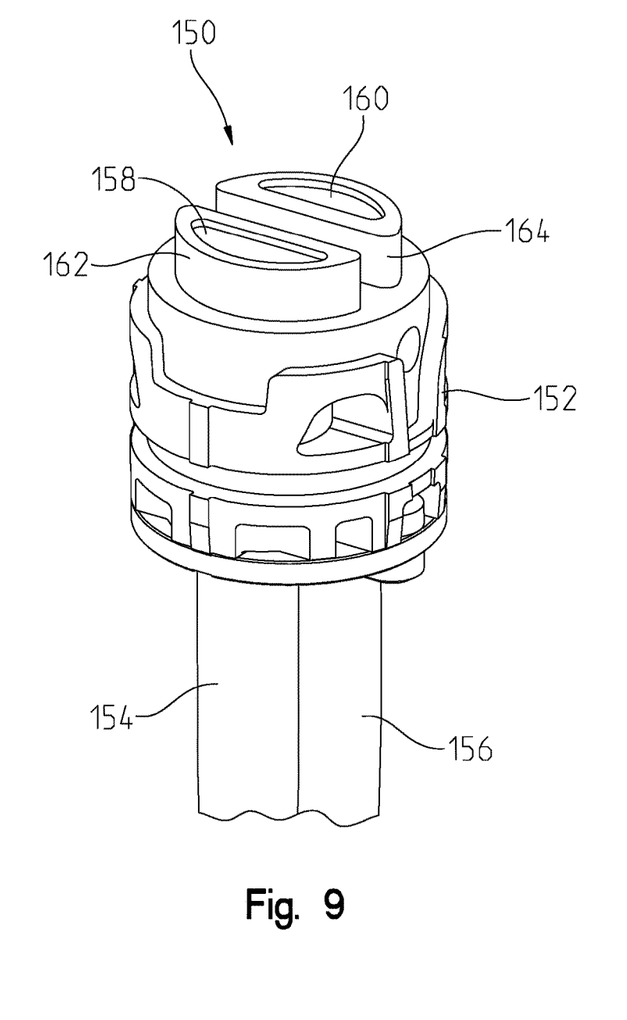
FIG. 9 is a first perspective view of an illustrative waterway assembly of the present disclosure.
Figure 10:
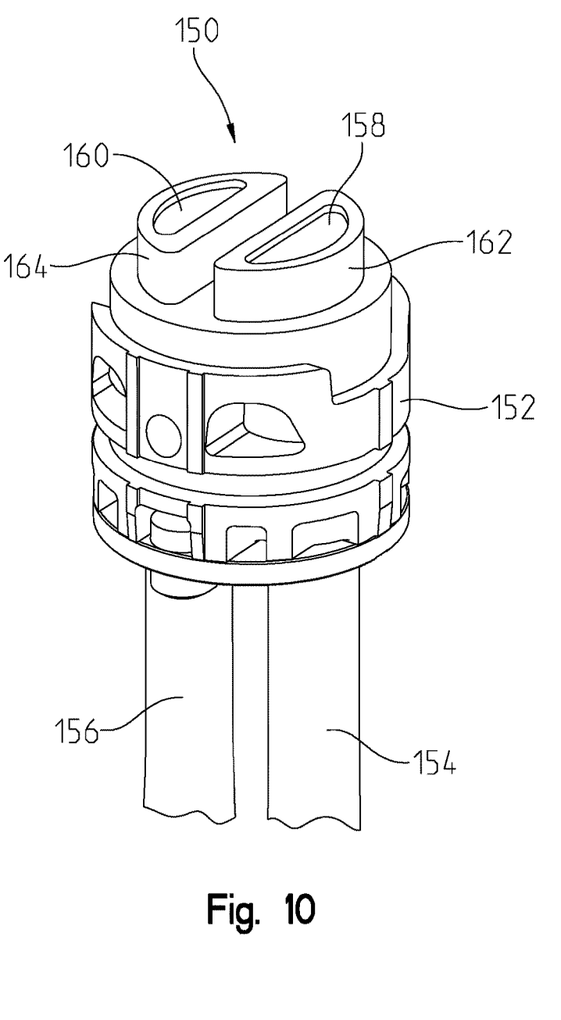
FIG. 10 is a second perspective view of the illustrative waterway assembly of FIG. 9.

With reference to FIGS. 6-8, the valve body 46 is illustratively formed of a polymer, such as an acetal plastic. Illustratively, the valve body 46 includes a sidewall 56 extending along a longitudinal axis 58, and an upper wall 60 including an opening 62 rotatably receiving the upper portion 52 of the valve stem 48. An o-ring 63 is illustratively received between the valve body 46 and the upper portion 52 of the valve stem 48. The valve stem 48 is positioned along the longitudinal axis 58 of the valve housing 46. The upper portion 52 of the valve stem 48 illustratively includes a shaft or rod 64 having a flat 65 defining a D-shaped cross-section (FIG. 8). The enlarged lower portion 54 of the valve stem 48 illustratively includes a sidewall 66 defining a flow chamber 68. Illustratively, a radial opening or outlet port 70 is formed in the sidewall 66 and is in fluid communication with the flow chamber 68.

With further reference to FIGS. 7 and 8, the body 46 of the valve assembly 44 illustratively includes an upwardly extending arcuate (e.g., semicircular) extension 72 that defines an arcuate opening or slot 74 cooperating with the valve stem 48 which extends above the upper wall 60 of the valve body 46, thereby defining a temperature limit stop as further detailed herein. The valve assembly 44 also illustratively includes a plurality of axial ribs 80, 82, 84 extending axially below arcuate shoulders 86, 88 and 90, respectively. Illustratively, the ribs 80, 82 are spaced circumferentially around the valve housing 46, and the ribs 84 are circumferentially spaced around the lower portion 54 of the valve stem 48. These ribs 80, 82, 84 are configured to reduce manufacturing costs by reducing the amount of material utilized to form the valve assembly 44. The ribs 84 are also configured to abate fluid flow noise during operation.

The body 46 of the valve assembly 44 illustratively includes two diametrically opposed alignment tabs 92, which extend axially below the shoulder 88. The illustrative valve stem 48 of the valve assembly 44 further includes two diametrically opposed protrusions 94, which extend axially below the shoulder 90 (FIG. 8).

With further reference to FIGS. 6-8, the illustrative valve assembly 44 includes a lower flow plate 96 coupled to the lower portion 54 of the valve stem 48. The lower flow plate 96 is illustratively form of a thin metal, such as stainless steel, and includes an inlet port or aperture 98 formed therein. In an illustrative embodiment flow plate 96, the inlet port 98 has a substantially crescent shape and is offset from the center of rotation 100 of the flow plate 96. Illustratively, the center of rotation 100 of the flow plate 96 is coaxially aligned with the longitudinal axis 58 of the valve body 46.

As noted above, the sidewall 66 of the valve assembly 44 defines flow chamber 68 for water flow through the valve assembly 44 from the water inlet conduit 24 to the water outlet conduit 28. The inlet port 98 is formed in the flow plate 96, and the outlet port 70 is formed in the sidewall 66 of the valve stem 48, wherein both the inlet port 98 and the outlet port 70 are in fluid communication with the chamber 68. More particularly, the inlet port 98 provides selective fluid communication between the water inlet conduit 24 and the chamber 68, while the outlet port 70 provides fluid communication between the chamber 68 and the water outlet conduit 28. During operation of the valve assembly 44, as further detailed below, water flows upwardly through inlet port 98, through the chamber 68 and out the outlet port 70. Certain aspects of the illustrative valve assembly 44 may be of the type further detailed in U.S. Pat. No. 4,700,928 to Marty, the disclosure of which is expressly incorporated herein by reference.

Figure 3:
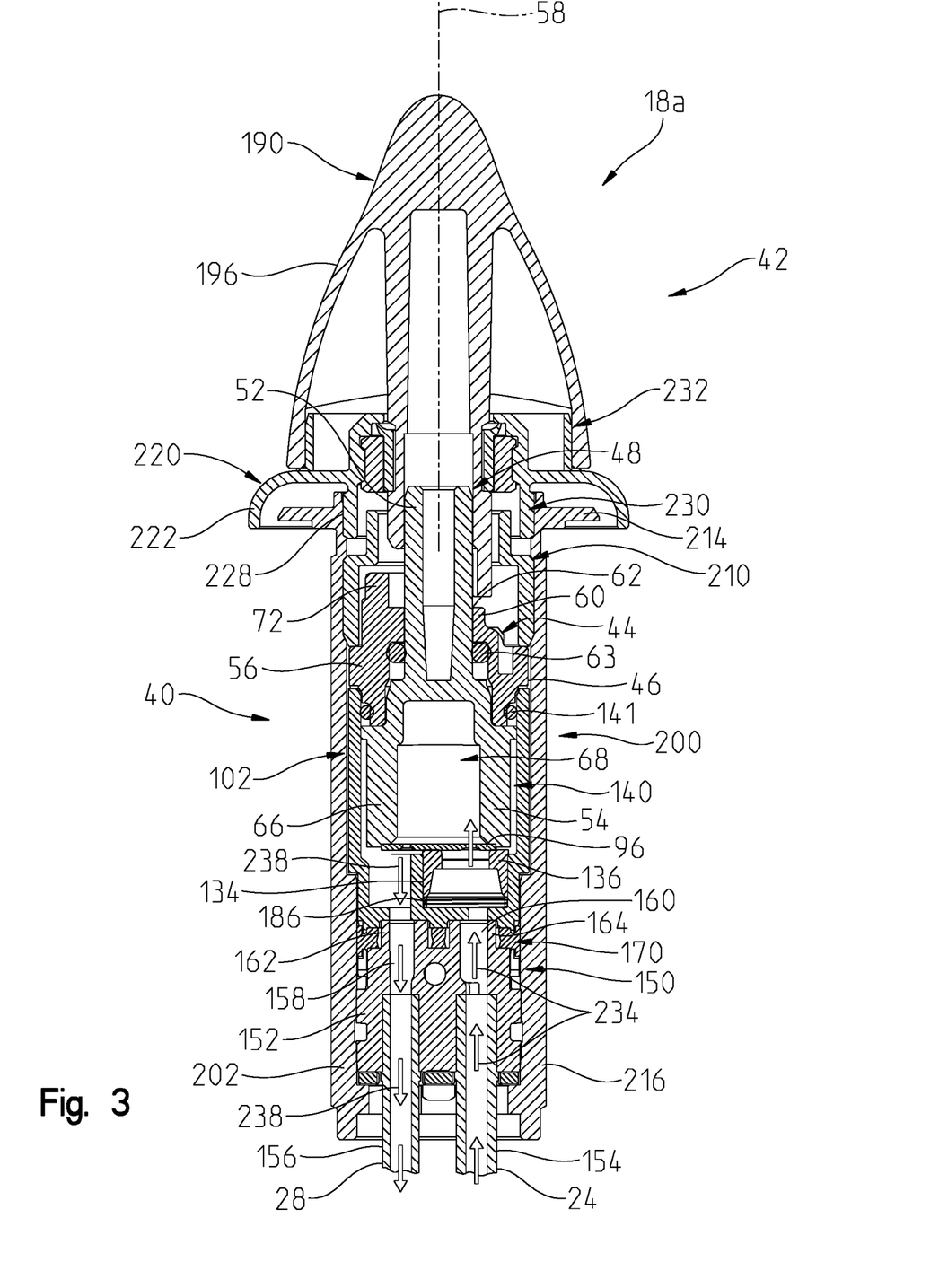
FIG. 3 is a cross-sectional view taken along line 3-3 of FIG. 2.
Figure 4:
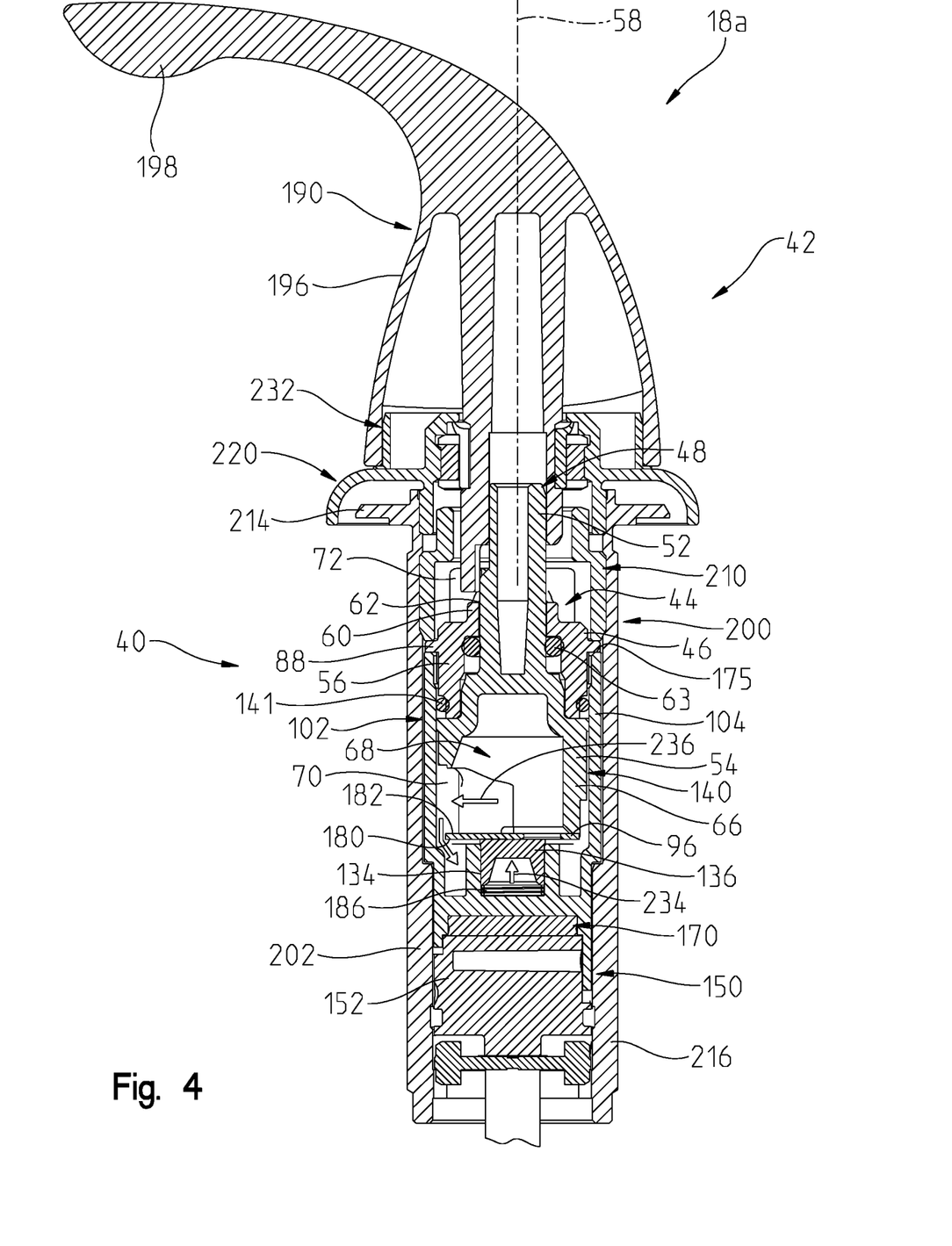
FIG. 4 is a cross-sectional view taken along line 4-4 of FIG. 2.
Figure 5:
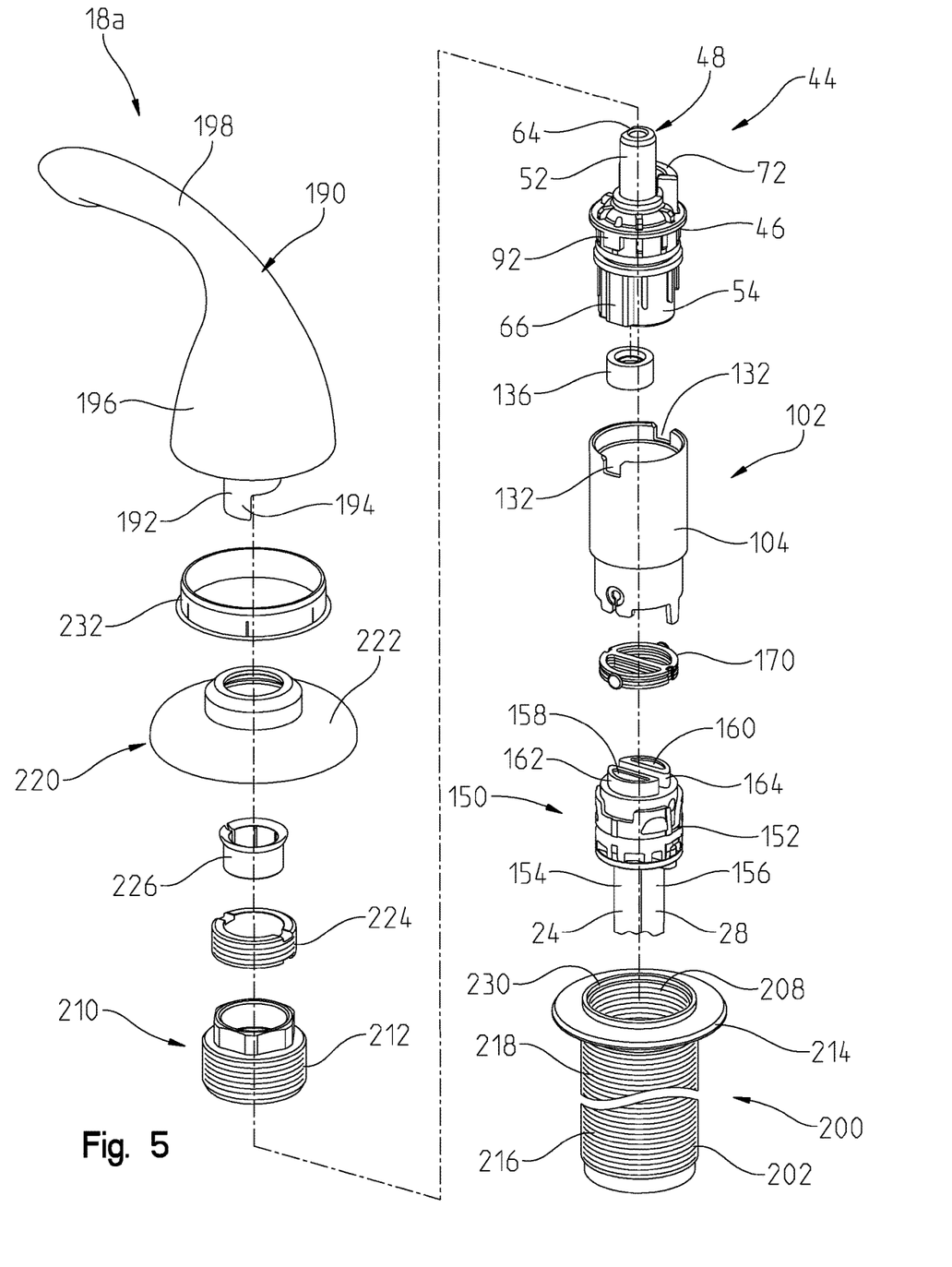
FIG. 5 is an upper exploded perspective view of the illustrative valve cartridge assembly of FIG. 2.
Figure 11:
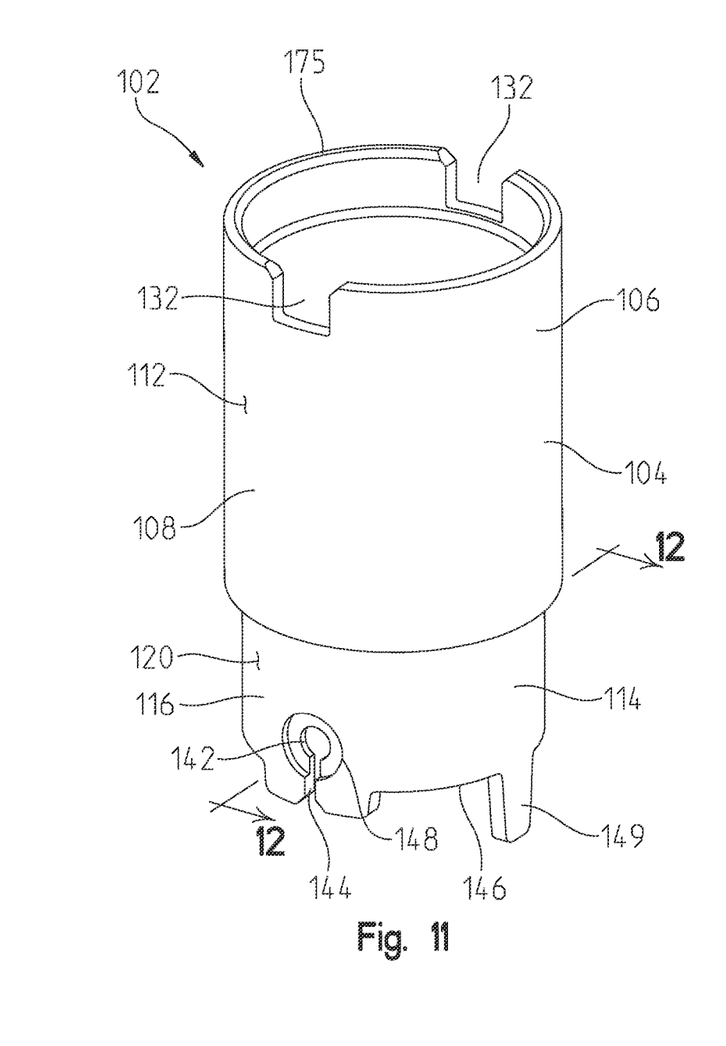
FIG. 11 is a perspective view of an illustrative polymeric receiver of the present disclosure.
Figure 12:
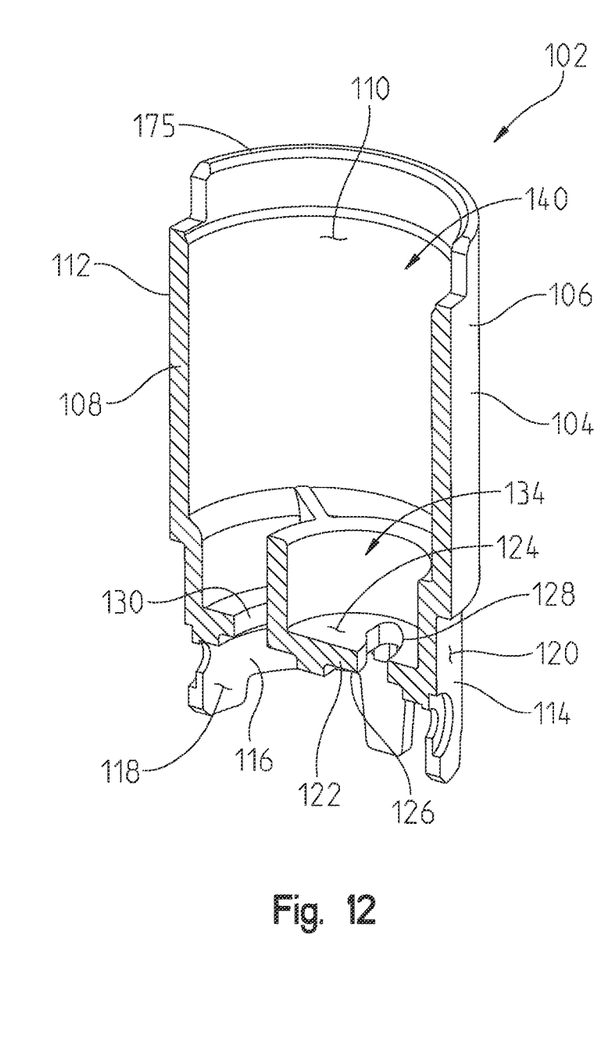
FIG. 12 is a perspective view in cross-section of the receiver of FIG. 10.
Figure 13:
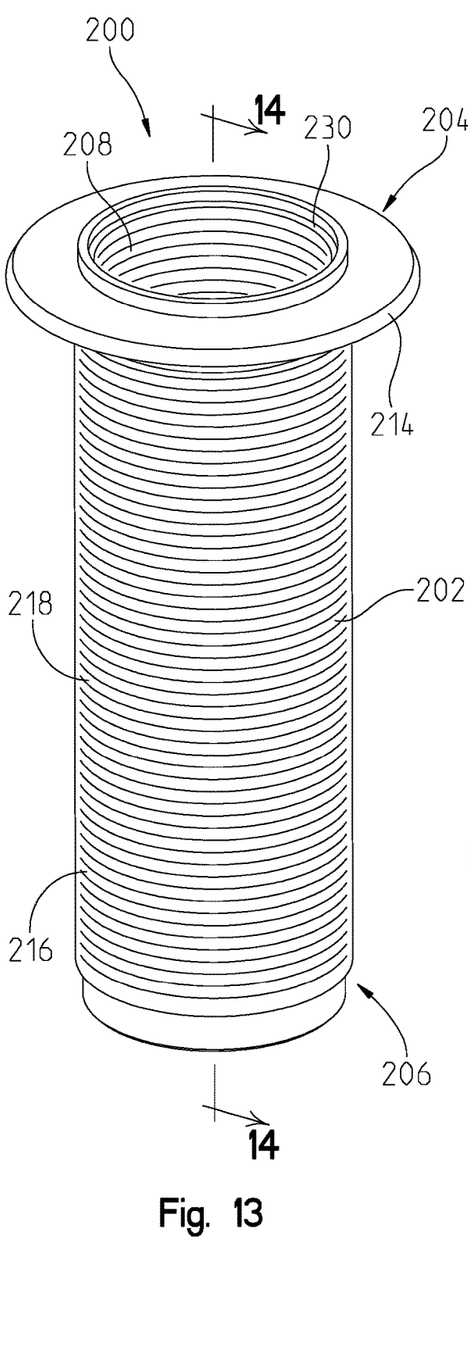
FIG. 13 is a perspective view of an illustrative mounting shank of the present disclosure.
Figure 14:
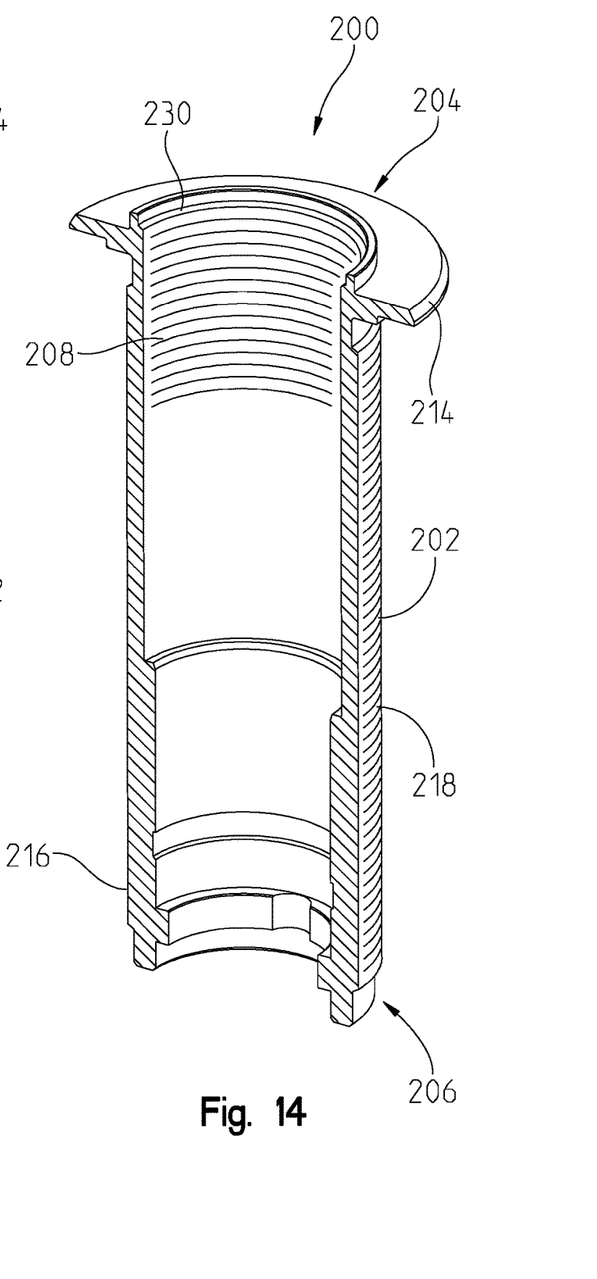
FIG. 14 is a perspective view in cross-section of the mounting shank of FIG. 13.
Figure 15:
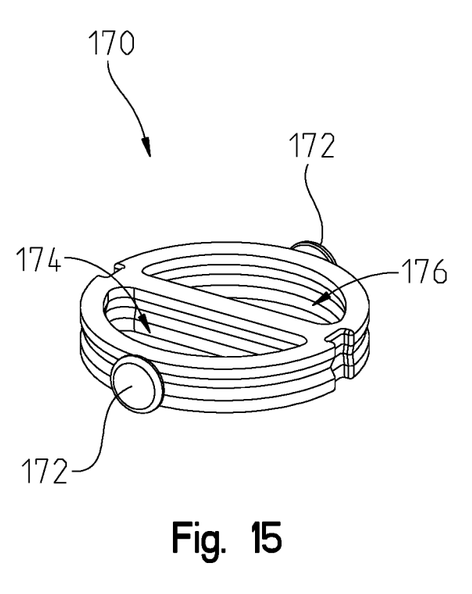
FIG. 15 is a perspective view of an illustrative gasket of the present disclosure.

With reference to FIGS. 3-5, the illustrative valve assembly 44 is supported by a receiver 102. The receiver 102 may include a body 104 formed of a polymer, such as a thermoplastic (e.g., nylon). With reference to FIGS. 11 and 12, the receiver 102 illustratively includes an upper portion 106 having a cylindrical sidewall 108 with an inner surface 110 and an outer surface 112. The receiver 102 further includes a lower portion or base 114 having a cylindrical sidewall 116 with an inner surface 118 and an outer surface 120. The sidewall 116 is coupled to a lower wall 122 having an upper surface 124 and a lower surface 126.

An inlet opening 128 and an outlet opening 130 extend through the lower wall 122 of the receiver 102 between the upper surface 124 and the lower surface 126. The upper portion 106 illustratively includes alignment recesses (e.g., slots) 132 that cooperate with the alignment tabs 92 of the valve assembly 44. The protrusions 94 of the valve assembly 44 engage with the inner surface 110 of the sidewall 108 to help couple and stabilize the valve stem 48 therein.

The lower portion 114 of the receiver 102 further includes an inner bore 134 receiving a seat seal 136 as further detailed below. The sidewalls 108, 116 define a chamber 140 for water flow through the receiver 102. The inner bore 122 is positioned below the chamber 140 and is fluidly coupled to the inlet opening 128. An o-ring 141 is illustratively received intermediate the lower surface 110 of the sidewall 108 and the valve body 46.

The lower portion 114 of the receiver 102 also includes two diametrically opposed openings, illustratively holes 142 and open slots 144 extending from the bottom of the holes 142 to a bottom surface 146 of the sidewall 116. Illustratively, retaining recesses 148 are formed concentric with the holes 142. A locating tab 149 may protrude axially from the bottom surface 146.

With reference to FIGS. 3-5, 9 and 10, a waterway assembly 150 is fluidly coupled to the valve cartridge 44. The illustrative waterway assembly 150 includes a base or puck 152, and a plurality of tubular members or conduits 154, 156 supported by the base 152. Illustratively, the waterway assembly 150 is formed of a polymer, such as a cross-linked polyethylene (PEX). In the illustrative embodiment, the tubular members 154 and 156 are the inlet conduit 24 and the outlet conduit 28, respectively, as further detailed above. The base 152 includes an inlet opening 158 and an outlet opening 160 in fluid communication with the tubular members 154 and 156, respectively. Axially upwardly extending protrusions 162 and 164 surround the openings 158 and 160, respectively. Additionally, the base 152 of the illustrative waterway assembly 150 includes a locating recess 148 that cooperates with the locating tab 136 on the receiver 102 to help orient the waterway assembly 140 relative to the body 104 of the receiver 102. In some illustrative embodiments, the waterway assembly 150 may include features similar to those detailed in U.S. Pat. No. 8,881,755 to Thomas et al., the disclosure of which is expressly incorporated herein by reference.

Referring now to FIGS. 3-5 and 15, a gasket 170 illustratively cooperates with the receiver 102 and the waterway assembly 150. More particularly, the gasket 170 is positioned intermediate the receiver 102 and the base 152 of the waterway assembly 150 to form a seal therebetween. The gasket 170 is illustratively formed of a resilient material, such as an elastomer (e.g., silicone). The gasket 170 illustratively includes diametrically opposed retaining protrusions or pins 172 that cooperate with the retaining holes 142 and slots 144 of the receiver 102 to secure the gasket 170 into place. The gasket 170 illustratively includes openings 174, 176 that cooperate with the waterway assembly 150 as further detailed below. Illustratively, the protrusions 162, 164 of the base 152 of the waterway assembly 150 are received within the openings 174, 176 of the gasket 170, wherein the gasket 170 seals the openings 162, 164 of the base 152 with the openings 128, 130 of the receiver 102, respectively.

The receiver 102 supports the valve assembly 44, wherein the shoulder 88 of the valve body 46 rests on an upper surface 175 of the sidewall 106 of the receiver 102, while the lower portion 54 of the valve stem 48 is received within the chamber of the receiver 102. The upper portion 52 of the valve stem 48 extends above the receiver 102, and a bottom surface 180 of lower flow plate 96 sealingly engages an upper surface 182 of the seat seal 136. The ribs 82, 84 of valve assembly 44 may extend outwardly to engage the inner surface 110 of the sidewall 106 of the receiver 100.

The seat seal 124 illustratively includes an annular body 184 and concentrically received within the bore 114 of the thermoplastic receiver 100. A spring 186 may engage with the seat seal 124 to bias the seat seal against the bottom surface 180 of the lower flow plate 96. The gasket 170 may be installed into the receiver 100 via the holes 142 and open slots 144 and locked into place via retaining holes 148. The waterway assembly 150 is illustratively coupled to the gasket 170 by engaging protrusions 162, 164 with openings 174, 176, respectively.

With further reference to FIGS. 2-6, the upper portion 42 of the illustrative valve assembly 18a includes a handle 190 which, in turn, includes a downwardly extending handle extension 192 supporting a stop 194 positioned radially within an outer housing or body 196 (FIG. 5). Illustratively, the handle 190 may be formed of a metal, such as a plated zinc. A user interface, such as a lever 198, is illustratively supported by an upper end of the outer body 196. The stop 194 cooperates with the extension 72 of the valve assembly 44. More particularly, the stop 194 is movable along the arcuate slot 74 of the valve assembly 44 to limit rotation of the faucet handle assembly 18a.

With reference to FIGS. 2-5, 13 and 14, the valve assembly 44, the receiver 102, and the waterway assembly 140 are supported by a valve body or mounting shank 200 including a cylindrical sidewall 202 extending axially between an upper end 204 and a lower end 206. The mounting shank 200 is illustratively formed of a metal, such as aluminum. Internal threads 208 are formed within the upper end 204 of the sidewall 202. A bonnet nut 210 includes external threads 212 that engage the internal threads 208 of the sidewall 202 to secure the valve assembly 44 within the mounting shank 200. More particularly, the bonnet nut 210 engages the shoulder 88 of the valve body 46. A flange 214 extends radially outwardly from the sidewall 202 proximate the upper end 204, and may be supported on the sink deck 12. The mounting shank 200 also includes a lower shaft 216 that extends through a mounting aperture (not shown) in the sink deck 12. The lower shaft 216 includes external threads 218 that couple to a conventional mounting nut (not shown) for securing the mounting shank 200 to the sink deck 12.

An escutcheon 220 may be positioned above the sink deck 12 and operably coupled intermediate the mounting shank 200 and the handle 190. The escutcheon 220 includes a body 222 formed of a metal, such as a plated zinc. The upper escutcheon 220 is operably coupled to the handle 190 via a nut 224 and a bushing 226, thereby allowing for relative rotation of the handle 190 relative to the escutcheon 220. The upper escutcheon 220 may include external threads 228 for coupling with internal threads 230 at the upper end of the mounting shank 200 (FIG. 3). Illustratively, a glide ring 232 is positioned intermediate the handle 190 and the escutcheon 220 to prevent contact therebetween. The glide ring 232 may be formed of a polymer, such as an acetal.

In operation of the valve assembly 18a, from an off position a user utilizes the lever 198 to rotate the handle 190 and activate water flow. Water flows into the inlet conduit 24 (as shown by arrows 234 in FIGS. 3 and 4) through the inlet opening 158 in the waterway assembly 150, the inlet port 98 of the flow plate 96, and into the chamber 68 of the valve stem 48 of the valve assembly 44. The water exits the valve assembly 44 through the outlet port 70 of the valve stem 48 and enters the chamber 140 of the receiver 102 (as shown by arrows 236 in FIG. 4). The water exits the receiver 102, flows through the outlet opening 160 in the waterway assembly 150, and into the outlet conduit 28 (as shown by arrows 238 in FIG. 3).

Although the invention has been described in detail with reference to certain preferred embodiments, variations and modifications exist within the spirit and scope of the invention as described and defined in the following claims.

The invention claimed is:

1. A valve cartridge assembly comprising:
   a valve cartridge including:
      a valve body having a cylindrical sidewall extending along a longitudinal axis;
      a valve stem extending along the longitudinal axis of the valve body, the valve stem including an upper portion and a lower portion;
      a flow plate coupled to the lower portion of the valve stem for rotation therewith and having an inlet port; and
      an outlet port formed in the lower portion of the valve stem and in fluid communication with the inlet port;
   a receiver formed of a polymer and including a body having a cylindrical sidewall, the receiver supporting the valve cartridge;
   a waterway assembly formed of a polymer and fluidly coupled to the valve cartridge, the waterway assembly including:
      a base; and
      a plurality of flexible tubular members supported by the base; and
   a gasket received intermediate the receiver and the base of the waterway assembly.

2. The valve cartridge assembly of claim 1, wherein the valve cartridge includes alignment tabs, and the receiver includes alignment slots, the alignment tabs cooperating with the alignment slots to facilitate proper orientation of the valve cartridge relative to the receiver.

3. The valve cartridge assembly of claim 1, wherein the inlet port in the flow plate is crescent shaped and offset from a center of rotation of the flow plate.

4. The valve cartridge assembly of claim 3, wherein the center of rotation of the flow plate is coaxial with the longitudinal axis.

5. The valve cartridge assembly of claim 1, further comprising a plurality of ribs spaced circumferentially around the valve body.

6. The valve cartridge assembly of claim 1, wherein the receiver sidewall includes diametrically opposed openings to facilitate retention of the gasket.

7. The valve cartridge assembly of claim 1, wherein the base of the waterway assembly includes protrusions configured to cooperate with the gasket.

8. A valve cartridge assembly comprising:
   a valve cartridge including:
      a valve body having a cylindrical sidewall extending along a longitudinal axis;
      a valve stem extending along the longitudinal axis of the valve body, the valve stem including an upper portion and a lower portion; and
      a flow plate coupled to the lower portion of the valve stem, the flow plate including an inlet port supported for rotation with the valve stem;
   a receiver formed of a polymer and including a body having a cylindrical sidewall, the receiver supporting the valve cartridge;
   a waterway assembly formed of a polymer and fluidly coupled to the valve cartridge, the waterway assembly including:
      a base; and
      a plurality of flexible tubular members supported by the base;
   a gasket received intermediate the receiver and the base of the waterway assembly;
   a mounting shank having a lower shaft including external threads;
   wherein the receiver, the base of the waterway assembly, and the gasket are received within the lower shaft of the mounting shank; and
   wherein the valve cartridge further includes an outlet port formed in the lower portion of the valve stem and in fluid communication with the inlet port.

9. The valve cartridge assembly of claim 8, wherein the valve cartridge includes alignment tabs, and the receiver includes alignment slots, the alignment tabs cooperating with the alignment slots to facilitate proper orientation of the valve cartridge relative to the receiver.

10. The valve cartridge assembly of claim 8, wherein the inlet port in the flow plate is crescent shaped and offset from a center of rotation of the flow plate.

11. The valve cartridge assembly of claim 8, further comprising a plurality of ribs spaced circumferentially around the valve body.

12. The valve cartridge assembly of claim 8, wherein the sidewall of the receiver includes diametrically opposed openings to facilitate retention of the gasket.

13. The valve cartridge assembly of claim 8, wherein the base of the waterway assembly includes protrusions configured to cooperate with the gasket.

14. A valve cartridge assembly comprising:
   a valve cartridge including:
      a valve body having a cylindrical sidewall extending along a longitudinal axis, and an arcuate extension defining a slot;
      a valve stem extending along the longitudinal axis of the valve body, the valve stem including an upper portion and a lower portion; and
      a flow plate supported for rotation with the valve stem and having an inlet port;
   a receiver formed of a polymer and including a body having a cylindrical sidewall, the receiver supporting the valve cartridge;
   a waterway assembly formed of a polymer and fluidly coupled to the valve cartridge, the waterway assembly including:
      a base; and
      a plurality of flexible tubular members supported by the base;
   a gasket received intermediate the receiver and the base of the waterway assembly;
   a faucet handle including a protrusion, wherein the protrusion cooperates with the slot of the valve cartridge to act as a limit stop; and
   wherein the valve cartridge further includes an outlet port formed in the lower portion of the valve stem and in fluid communication with the inlet port.

15. The valve cartridge assembly of claim 14, wherein the valve cartridge includes alignment tabs, and the receiver includes alignment slots, the alignment tabs cooperating with the alignment slots to facilitate proper orientation of the valve cartridge relative to the receiver.

16. The valve cartridge assembly of claim 14, wherein the inlet port in the flow plate is crescent shaped and offset from a center of rotation of the flow plate.

17. The valve cartridge assembly of claim 14, further comprising a plurality of ribs spaced circumferentially around the valve body.

18. The valve cartridge assembly of claim 14, wherein the sidewall of the receiver includes diametrically opposed openings to facilitate retention of the gasket.

19. The valve cartridge assembly of claim 14, wherein the base of the waterway assembly includes protrusions configured to cooperate with the gasket.

20. The valve cartridge assembly of claim 14, further comprising:
- a mounting shank having a lower shaft including external threads; and
- wherein the receiver, the base of the waterway assembly, and the gasket are received within the lower shaft of the mounting shank.

\* \* \* \* \*